Patented Mar. 16, 1948

2,437,766

UNITED STATES PATENT OFFICE 2,437,766

METHOD OF CULTURING FUNGI

Elmer C. Stevenson, Takoma Park, and John W. Mitchell, Silver Spring, Md., assignors to United States of America, as represented by the Secretary of Agriculture No Drawing. Application July 20, 1945, Serial No. 606,296

6 Claims. (Cl. 195—81)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to fungi culture and has among its objects the provision of a method for inhibiting the growth of contaminating bacteria in fungi culture media. Other objects will be apparent from the description of the invention.

In cultivating fungi, bacterial contaminants often interfere with the growth of the fungi. For example, in cultivating *Penicillium notatum* for the ultimate production of penicillin, bacterial contaminants, such as air-borne *Bacillus subtilis*, interfere with the growth of the fungus and, consequently, greatly decrease the yield of penicillin.

We have found that 2,4-dichlorophenoxyacetic acid and its alkali metal salts, such as the sodium and potassium salts, when present in the fungus nutrient medium in concentrations of fractional percentages by weight, exhibit bacteriostatic and bactericidal properties. Preferred concentrations are in the approximate range of 0.02 percent to 0.08 percent, although concentrations above and below this range are effective. For example, the growth of the fungi Penicillium sp., *Penicillium notatum*, Fusarium sp., *Rhizoctonia solani*, and *Alternaria solani* was not affected by the presence of the acid or the alkali metal salts of the acid, whereas the growth of *Bacillus subtilis*, *Staphylococcus aureus* and *Phytomonas tumefaciens*, also present in the culture, was completely retarded. In the case of *Aerobacter cloacae*, the growth of this organism was also partially inhibited, and in practically every instance the organism was completely destroyed in a very short time subsequent to the inhibited growth.

The following examples are illustrative of the invention.

Example I

A culture medium of potato dextrose agar was prepared from 200 g. of peeled potatoes, 20 g. of dextrose, 15 g. of agar, and 1,000 ml. of water. Two lots of this culture medium were then prepared, one containing 0.1 percent, by weight, of 2,4-dichlorophenoxyacetic acid and 0.5 percent, by weight, of polyethylene glycol, and the other containing 0.5 percent, by weight, of polyethylene glycol. The media were then adjusted with 1 N NaOH to give pH values of about 5, 6, 7, and 8, respectively, in aliquots of the two series. All manipulations involving the media were made in the open laboratory, the media and utensils used were not sterilized, and no attempt was made to avoid contamination. Five petri dishes were used for each medium, 15 ml. being used for each dish.

After the media has solidified, spores of Penicillium sp. were dusted over the surfaces of all plates. The plates were then closed and incubated at about 28° C. Within two days, colonies of *Bacillus subtilis* and the Penicillium sp. were observed on all of the control plates from pH 5 through pH 8. No colonies of bacteria were observed on the 2,4-dichlorophenoxyacetic acid media at pH 5, 6, or 7, but some very small, apparently static colonies, about 3 mm. in diameter, appeared on the treated agar at pH 8. These colonies, however, disappeared a few days after their appearance. The bacteria overran the control plates at pH 7 and pH 8 so rapidly that the fungus barely made pin-point spots before the surfaces of the media were completely covered with bacteria, thus checking the growth of the fungus. The Penicillium sp. grew vigorously on all media treated with the 2,4-dichlorophenoxyacetic acid except at pH 8, in which case its growth was somewhat limited because of the relatively high alkalinity. There was no apparent antagonism between the fungus and the bacteria. The relative appearance of these plates remained unchecked for about 15 days, even though they were opened on several occasions after about 3 days' incubation.

Example II

Two lots of potato dextrose agar were prepared, one containing 0.1 percent, by weight, of the acid and 0.5 percent, by weight, of polyethylene glycol, the other containing 0.5 percent, by weight, of polyethylene glycol. With one lot being maintained at 0.1 percent, by weight, of the acid and one lot being polyethylene glycol control agar, the acid-treated medium was then diluted with polyethylene glycol to give concentrations of 0.02, 0.04, 0.06, and 0.08 percent, by weight, of the acid. 1 N NaOH was then added, so that the media at each 2,4-dichlorophenoxyacetic acid concentration were adjusted to about pH 6 and pH 7. The polyethylene glycol control was similarly adjusted to pH 6 and pH 7. These media were then autoclaved for about 15 minutes at about 15 pounds' steam pressure, and about 15 ml. then poured into each petri dish and allowed to cool.

After cooling, five plates of each medium were then inoculated on the left side with mycelial transfers of a Fusarium sp., streaked on the right side with *Aerobacter cloacae* isolated from bean plants, and then streaked down the center of the plate with *Bacillus subtilis* which had appeared in the control plates of the foregoing example. The plates were then incubated at about 28° C. After about two days' incubation, the fungus was found to be growing vigorously in all plates. However, there was a definite bacteriostatic effect on both bacteria at all concentrations of the acid. The growth of *Bacillus subtilis* was retarded more than that of *Aerobacter cloacae*, and at 0.08 percent concentration the former was completely inhibited, while the latter was definitely retarded. Very slight growth of both bacteria took place at the 0.1 percent concentration of the acid. After one week, the inhibiting effect was more pronounced, and transfers were made to potato dextrose agar from the margins and from the centers of the streaks of *Aerobacter cloacae*, which had grown in the medium containing 0.5 percent polyethylene glycol and 0.08 percent of the acid. There was no growth from the marginal transfers, nor was there any growth in four out of five cases of the central transfers, and it was apparent, therefore, that most of the bacteria had been unable to maintain growth in the 0.08 percent concentration. The *Fusarium* sp. grew well at all concentrations of the acid.

*Example III*

The water-soluble sodium salt of 2,4-dichlorophenoxyacetic acid was prepared by adding 1 N NaOH to the acid. All percentages being by weight, the media here used were (1) potato dextrose agar plus 0.02 percent Na salt plus 0.5 percent polyethylene glycol, (2) potato dextrose agar plus 0.08 percent Na salt plus 0.5 percent polyethylene glycol, (3) potato dextrose agar plus 0.02 percent Na salt, and (4) potato dextrose agar plus 0.08 percent Na salt. Control media composed one lot of plain potato dextrose agar and one lot of potato dextrose agar containing 0.05 percent polyethylene glycol. These media were all adjusted to a pH of about 7 with 1 N NaOH, sterilized at about 15 pounds' steam pressure for about 20 minutes, and 15 ml. then poured into 9 cm. petri dishes and allowed to cool. After cooling, ten plates of each media were streaked with three bacteria, namely, *Bacillus subtilis*, *Staphylococcus aureus*, and *Phytomonas tumefaciens*.

It was found that at the 0.02 percent concentration of the sodium salt of 2,4-dichlorophenoxyacetic acid, there was a decided retarding effect on growth of all three bacteria. At the 0.08 percent concentration of the salt, *Staphylococcus aureus* and *Phytomonas tumefaciens* were completely inhibited, while with *Bacillus subtilis*, just a faint cloudiness was visible along the streak.

The presence or absence of the polyethylene glycol had little effect on the action of the sodium salt of the acid, although it was indicated that the salt alone at 0.02 percent concentration had a greater retarding effect than the salt in combination with the polyethylene glycol.

*Example IV*

Using the techniques of Example III, it was found that at 0.08 percent concentration of the sodium salt of 2,4-dichlorophenoxyacetic acid in potato dextrose agar, *Bacillus subtilis* was completely inhibited, whereas no effect on the growth of *Penicillium notatum* was exhibited when the two were grown in the same petri dish.

Although the invention has been described as a method of inhibiting bacterial growth in fungal cultures, it is to be understood that the presence of fungi in the medium is not necessary in order to obtain this effect.

Having thus described our invention, we claim:

1. A method of cultivating a fungus comprising adding a member selected from the group consisting of 2,4-dichlorophenoxyacetic acid and the alkali metal salts of said acid to a fungus nutrient medium to inhibit the growth of contaminating bacteria therein, inoculating the medium with a fungus selected from the group consisting of Penicillium sp., Fusarium sp., *Rhizoctonia solani*, and *Alternaria solani*, and incubating the inoculated medium.

2. A method of cultivating a fungus comprising adding 2,4-dichlorophenoxyacetic acid to a fungus nutrient medium to inhibit the growth of contaminating bacteria therein, inoculating the medium with a fungus selected from the group consisting of Penicillium sp., Fusarium, sp., *Rhizoctonia solani*, and *Alternaria solani*, and incubating the inoculated medium.

3. A method of cultivating a fungus comprising adding the sodium salt of 2,4-dichlorophenoxyacetic acid to a fungus nutrient medium to inhibit the growth of contaminating bacteria therein, inoculating the medium with a fungus selected from the group consisting of Penicillium sp., Fusarium sp., *Rhizoctonia solani*, and *Alternaria solani*, and incubating the inoculated medium.

4. A method of cultivating a fungus comprising adding about 0.02 to 0.08 percent, by weight, of a member selected from the group consisting of 2,4-dichlorophenoxyacetic acid and the alkali metal salts of said acid to a fungus nutrient medium to inhibit the growth of contaminating bacteria therein, inoculating the medium with a fungus selected from the group consisting of Penicillium sp., Fusarium sp., *Rhizoctonia solani*, and *Alternaria solani*, and incubating the inoculated medium.

5. A method of cultivating *Penicillium notatum* comprising adding a member selected from the group consisting of 2,4-dichlorophenoxyacetic acid and the alkali metal salts of said acid to a fungus nutrient medium to inhibit the growth of contaminating bacteria therein, inoculating the medium with *Penicillium notatum*, and incubating the inoculated medium.

6. A method of cultivating a fungus comprising adding a solution of polyethylene glycol containing about 0.02 to 0.08 percent, by weight, of a member selected from the group consisting of 2,4-dichlorophenoxyacetic acid and the alkali metal salts of said acid to a fungus nutrient medium to inhibit the growth of contaminating bacteria therein, inoculating the medium with a fungus selected from the group consisting of Penicillium sp., Fusarium sp., *Rhizoctonia solani*, and *Alternaria solani*, and incubating the inoculated medium.

ELMER C. STEVENSON.
JOHN W. MITCHELL.

REFERENCES CITED

The following references are of record in the file of this patent:

UNITED STATES PATENTS

| Number | Name | Date |
|---|---|---|
| 2,322,671 | Lontz | June 29, 1943 |
| 2,390,941 | Jones | Dec. 11, 1945 |